UNITED STATES PATENT OFFICE.

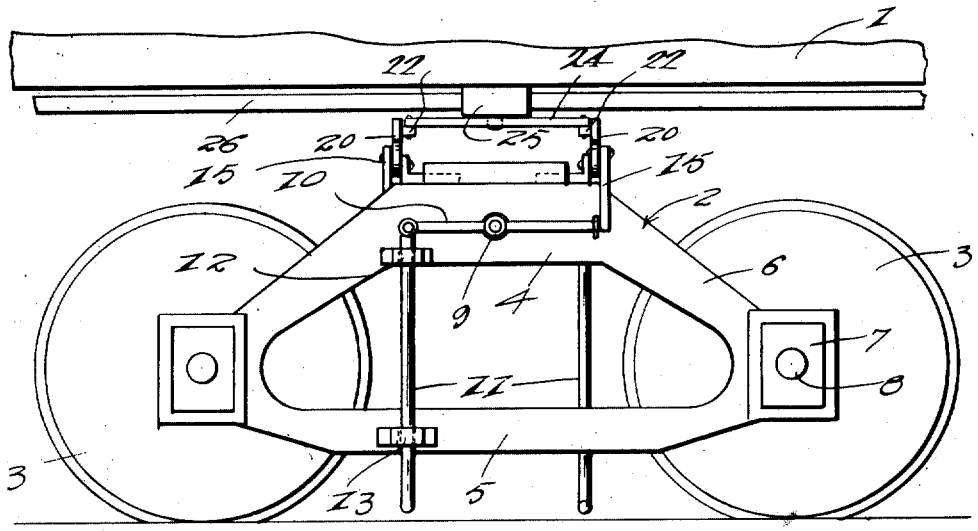

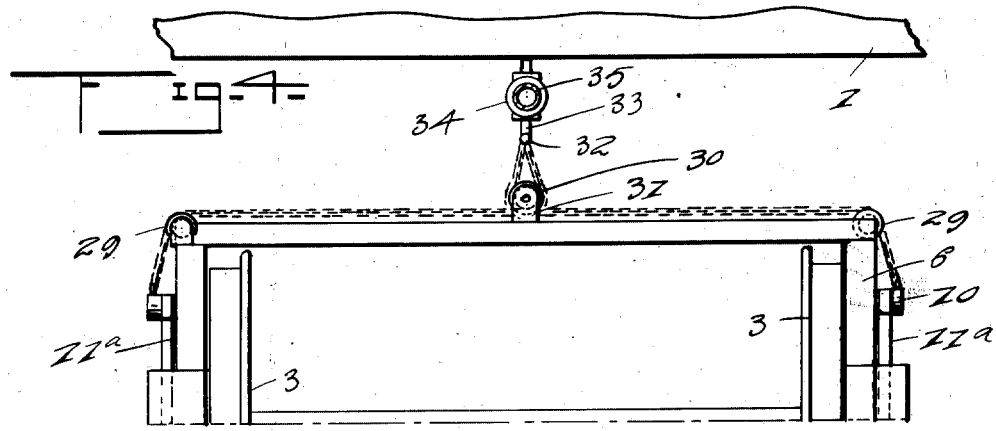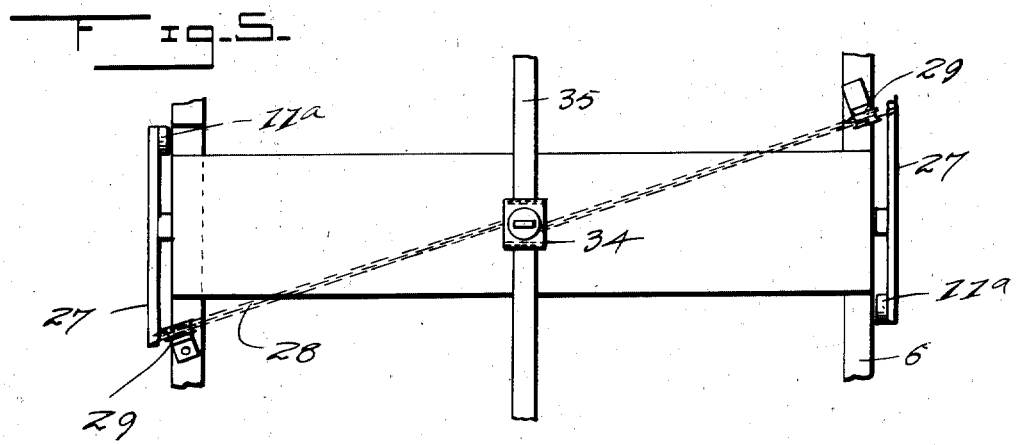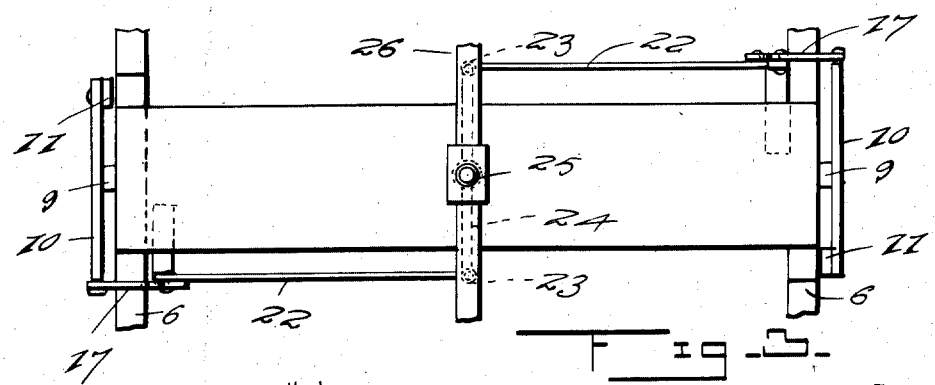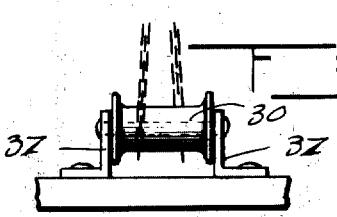

DAVID D. O'CONNELL, OF SPOKANE, WASHINGTON.

AUTOMATIC STOP FOR RAILWAYS.

1,253,086.  Specification of Letters Patent.  Patented Jan. 8, 1918.

Application filed November 24, 1916. Serial No. 133,193.

*To all whom it may concern:*

Be it known that I, DAVID D. O'CONNELL, a citizen of the United States, residing at Spokane, in the county of Spokane and State of Washington, have invented certain new and useful Improvements in Automatic Stops for Railways; and I do hereby declare the following to be a full, clear, and exact description of the invention, such as will enable others skilled in the art to which it appertains to make and use the same.

This invention relates to new and useful improvements in automatic stops for railways and the principal object of the invention is to provide a device adapted to be attached to a railway truck to set the brakes in case any wheel of a train should become derailed thereby avoiding the possibility of the derailment of several cars.

Another object of the invention is to provide a device which is carried in close proximity to the rails, so that upon the slightest downward movement of the truck should the wheel leave the track, the brake pipe will be bled, thereby setting the brakes and stopping the train.

With these and other objects in view the invention consists in the novel combination and arrangement of parts which will be fully set forth in the following specification and accompanying drawings, in which:—

Figure 1 is a fragmentary view of a car truck showing this improved attachment applied thereto.

Fig. 2 is a vertical sectional view through Fig. 1.

Fig. 3 is a top plan view of a portion of the truck showing the method of operating the device.

Fig. 4 is a fragmentary end view of a truck showing a modified form of the device.

Fig. 5 is a top plan view of Fig. 4, and

Fig. 6 is an enlarged detail view of the pulley for guiding the valve operating chains.

Referring to the drawings the numeral 1 designates a car of the ordinary construction having the usual truck 2 pivotally mounted thereon which truck carries the usual wheels 3 and comprises the upper bar 4 and lower bar 5 which upper bar is provided with the downwardly extending bars 6 which join the bar 5 at its ends in which the journal bearings 7 of the axle 8 on which the wheels 3 are mounted is secured.

Pivotally connected as at 9 to the bar 4 at a point substantially centrally thereof is a rocking lever 10 having pivoted to one end a vertically slidable rod 11 which is slidable through suitable brackets 12 and 13 mounted on the bars 4 and 5 respectively. The lower end of the rod or plunger 11 is provided with an inturned portion 14 which is of considerable length so that it extends beyond the sides of a railway rail as clearly shown in Fig. 2.

Pivotally connected to the end of the rocking lever 10 opposite that which is connected to the plunger 11 is a link 15 the upper end of which is pivotally connected as at 16 to the outwardly extending arm 17 of the bell crank lever designated generally by the numeral 18 which is pivoted as at 19 to a suitable bracket supported on the upper side of the bar 4. The upstanding arm 20 of the bell crank 18 is pivotally connected as at 21 to a rod 22 which has its opposite end pivoted as at 23 to the valve handle 24 which is connected to a valve 25 arranged in the train pipe 26. This valve forms an exhaust when in open positions so that the pressure in the train pipe will be reduced thereby setting the brake. The valve is normally in closed position so that the rods 11 are downwardly to their farthest limit and when the truck leaves the rail it will be seen that the arm 14 on the lower end of the rod will engage the upper side of the track rail thereby moving said plunger rod upwardly and causing the bell crank to exert pull on the rod 22 thus turning the valve handle 24 so as to open the valve 25.

In the modified form of the device, the truck has pivotally connected thereto a rocking lever 27 provided with a suitable plunger 11$^a$ which is constructed in accordance with the plunger 11. Connected to the end of the rocking lever 27 opposite that to which the plunger 11$^a$ is connected is a chain 28 which passes upwardly and over a suitable roller or pulley 29 and thence under a suitable guide roller 30 mounted between suitable brackets 31 which are attached to the upper side of the truck and this chain is connected at 32 to a valve handle 33 which controls the opening and closing of a valve 34 arranged in the train pipe 35. It will thus be seen that should the truck leave the track, pull will be exerted on one or the other of the chains thereby causing the valve to move to open position thus venting the train line and setting the brakes.

While in the foregoing there has been shown and described the preferred embodiment of this invention, it is to be understood that such changes may be made in the combination and arrangement of parts as will fall within the spirit and scope of the invention as claimed.

What is claimed is:—

The combination with a railway car having a train pipe and a truck, of a valve located in the train pipe directly above the truck, a handle on said valve for operating the same, said handle extending outwardly from each side of the valve for equal distances, a horizontal rocking lever pivotally secured to the outer side of each end of the truck, a vertical plunger rod slidably mounted on the outer ends of the truck and having the upper ends thereof pivotally secured to the adjacent end of each rocking lever, the lower end of each vertical sliding plunger rod being bent inwardly at right angles toward each other, so as to overlie the rails of a track, and means operatively connecting the opposite end of each horizontal rocking lever with the free ends of the valve handle, as and for the purpose specified.

In testimony whereof I affix my signature in presence of two witnesses.

DAVID D. O'CONNELL.

Witnesses:
N. J. WYCKOFF,
M. C. FIFE.